United States Patent Office 3,245,655
Patented Apr. 12, 1966

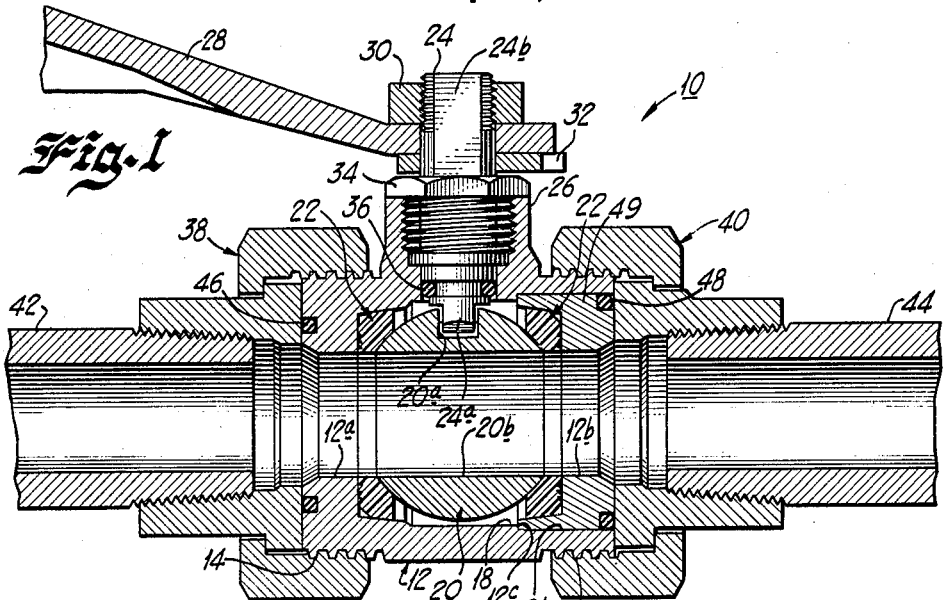

3,245,655
BALL VALVE SEAT HAVING RIBBED
SEALING FACE
Robert W. Oetjens, Arlington Heights, Ill., assignor to Clayton Mark & Company, Evanston, Ill., a corporation of Delaware
Filed Sept. 4, 1962, Ser. No. 221,210
6 Claims. (Cl. 251—315)

The present invention relates to improvements in ball valves and has for an object the provision of a new and improved ball valve of the type having a ball valve element rotatably supported in a valve chamber provided in the valve body upon a pair of opposed seating rings.

Another obpect of the present invention is to provide a new and improved seating ring for a ball valve of the type described above wherein improved seating of the ring within the valve chamber against an annular body surface is provided when the valve is closed.

Another object of the present invention is to provide a new and improved seating ring for a ball valve of the type described above wherein the ring is provided with a seating face for engaging the annular surface of the valve body, the face having a first annular portion and a second portion spaced therefrom including one or more annular concentric ridges or ribs of relatively narrow width formed by one or more annular serrations.

Another object of the present invention is to provide a new and improved seating ring as described in the preceding paragraph wherein the sealing pressure on the serrated face of the seating ring is increased to provide a more positive seal between the ring and the valve body in the closed position of the valve.

Another object of the present invention is to provide a new and improved seating ring of the type described wherein the ridges formed by the serrations act as resilient spring members to provide a more effective low pressure seal and in addition to minimize the tendency of the rings to cold flow under pressure, whereby life expectancy of the ring is increased.

Another object of the present invention is to provide a new and improved ball valve with seating rings of the type described having one or more annular serrations which act as resilient spring members providing flexible sealing action so that when the valve is operated, the torque necessary to rotate the ball valve element is reduced with a consequent increase in the life of the seating rings.

Another object of the present invention is to provide a new and improved seating ring of the type described having one or more annular serrations providing concentric flexible seals on the sealing face which act as resilient spring members and consequently allow more liberal tolerances to be used in the manufacture of the valve and its parts, as well as allowing a greater interference or engagement between the seating rings, valve body and ball valve element.

Another object of the present invention is to provide a new and improved separated seating ring of the type described in which the serrations provide sealing portions of such cross sectional shape that the upstream seating ring will more readily by-pass and equalize the upstream pressure around the ring, thereby reducing the torque necessary to open the valve, and wherein the upstream pressure will operate against the downstream seating ring more positively to seal the ridges formed by the serrations thereon against the valve body.

In brief, the foregoing and other objects of the present invention are accomplished by providing a ball valve having a rotatable ball valve element supported within a valve chamber on, preferably, a pair of new and improved opposed annular seating rings each of which is provided with a seating face having one or more annular serrations forming ridges or ribs of relatively narrow width for engaging cooperating annular surfaces provided in the valve body. The face of the seating ring includes a first annular portion and a second portion spaced therefrom which includes one or more annular ridges of relatively narrow width formed by serrations provided in concentric relation to each other and to the first annular portion. When the valve is closed, the fluid pressure against the ball valve element is transmitted through the downstream seating ring to the valve body by way of one or more ridges, thus increasing the unit pressure on these narrow ridges and effecting a tight seal against the valve body.

In one of the embodiments of the invention, the seating ring face is provided with a plurality of annular serrations forming a plurality of generally triangular cross sectioned ridges having relatively narrow peaks or apical portions spaced concentrically from the first annular seating portion of the ring so that a plurality of relatively narrow regions of high pressure circular sealing engagements are provided between the ring and the valve body.

In another embodiment of the invention, the seating ring face is provided with a single annular relatively narrow ridge of generally triangular cross section spaced inwardly from a first annular seating portion and formed by an annular serration on the seating ring.

The ridges or ribs are slanted so that they extend or are inclined radially outwardly of the axes of the rings and away from the ball element. This construction enables fluid more readily to by-pass the upstream seating ring to equalize pressures on opposite sides of the ring. This construction also provides a tighter seal at the downstream side as a result of fluid pressure acting on the ridges to force them radially inwardly and outwardly against the valve body.

Other objects and advantages of the present invention will become apparent from the following detailed description taken in conjunction with the drawings, in which:

FIG. 1 is an axial cross sectional view taken along the longitudinal axis of a ball valve constructed in accordance with the present invention, the valve being shown in open position;

FIG. 2 is a fragmentary enlarged cross sectional view of the ball valve of FIG. 1 taken along the longitudinal axis thereof with the valve in its closed position;

FIG. 3 is an elevational view of a seating ring of the ball valve of FIGS. 1 and 2 taken along the line 3—3 of FIG. 2;

FIG. 4 is a sectional view of the seating ring of FIG. 3 taken along the line 4—4 of FIG. 3;

FIG. 5 is a fragmentary enlarged view of a portion of a seating ring of FIGS. 1 to 4 illustrating details of the serrations and ridges provided in the ring.

FIG. 6 is a sectional view similar to FIG. 4 of another form of seating ring constructed in accordance with the invention.

Referring now to the drawing, a ball valve constructed in accordance with the present invention is illustrated as a whole in FIG. 1 and is identified generally by the reference number 10.

The valve 10 is provided with a valve body 12 having opposed externally threaded ends 14 and 16 and a centrally located valve chamber 18. Positioned within the chamber is a rotatable ball valve element or ball 20 which is supported for rotation on a pair (preferably) of new and improved annular seating rings 22 made in accordance with the present invention and which will be described in detail hereinafter.

In order to rotate the ball 20 between an open position shown in FIG. 1 and a closed position shown in FIG. 2, there is provided a spindle 24 which is journaled in a valve bonnet 26 formed in the valve body. The spindle 24 is provided with a depending tongue 24a which is loosely engaged within a slot 20a provided in the ball 20 so that the ball will rotate when the spindle is turned and giving the ball some freedom of movement relative to the spindle. The upper end of the spindle is provided with one or more flats 24b and receives an operating handle 28. A nut 30 is threaded onto the upper end of the spindle 24 to secure the handle thereon and a stop plate 32 is provided to turn with the spindle to engage stop pins on the valve body (not shown), thus to limit the rotation of the spindle and ball between an open and closed position. The spindle 24 is retained in the bonnet 26 by means of a threaded collar 34 and an O-ring 36 is provided on the spindle to prevent fluid from the valve chamber 18 from leaking around the spindle.

At the ends of the valve body 12 there are provided coupling assemblies 38 and 40 for connecting the valve to pipes or lines 42 and 44. O-rings 46 and 48 are positioned at the ends of the valve body to provide seals between the coupling assemblies and the valve.

The ball 20 is provided with a central flow passage 20b which, when the valve is in the open position, is axially aligned with flow passages 12a and 12b in the valve body. The passage 12a provides communication between the pipe 42 and the chamber 18 and the passage 12b provides communication between the chamber 18 and the pipe 44 so that when the valve is open fluid can pass through the valve. The passage 12b is actually formed in an annular spacer 49 which forms the right hand wall of the chamber 18. The spacer 49 abuts against a small shoulder 12c provided in the valve body by an enlarged counterbore 12d.

The seating rings 22 may be constructed and arranged relative to the valve body as disclosed and claimed in the application of Robert P. Montesi, application Serial No. 148,645, filed October 30, 1961. They are thus each provided with a radially disposed seating rear face 22a (see particularly FIG. 4) and a generally conical outer peripheral seating surface 22b which engage, respectively, a radially disposed valve body surface 18a and a conical body surface 18b. The conical surfaces of the ring and body are inclined radially outwardly of the axes of the rings and toward the axis of rotation of the ball. As disclosed in the aforesaid Montesi application, this construction provides an improved arrangement for pressure equalization around the upstream seating ring in the closed position of the valve, as illustrated in FIG. 2, in which the upstream ring is moved away from the valve body. The corners of the rings whereat surfaces 22a and 22b join are chamfered as indicated by reference character 22c to provide clearance to insure proper seating of the rings without close manufacturing tolerances. Each ring is provided with a generally cylindrical internal bore 22d of substantially the same diameter as flow passages 12a and 12b, a surface 22e for engaging the surface of the ball 20 to support it for rotation in the chamber 18 and a generally radial front face 22f.

In accordance with the present invention, the rear or seating face 22a of the ring is provided with a radially outwardly disposed annular portion 50 adjacent the chamfered surface 22c and a plurality of concentric annular serrations 52 spaced inwardly therefrom forming annular, concentric ridges or ribs 54 having peaks 54a of relatively narrow width providing narrow concentric circular regions of sealing contact of narrow width with the surface 18a of the valve chamber. The ridges 54 act as resilient spring members so that as pressure is applied to the surfaces 22e and 22f of the ring forcing it against the seating surface 18a of the valve chamber, the ridges are flattened to some extent at their peaks 54a, thereby forming a tight seal. Since the area of contact between the surface 18a of the chamber and the ring is limited because of the serrations 52, the unit load between these members is high resulting in a more positive seal therebetween. The rings 22 may be constructed of tetrafluoroethylene or other plastic material and it has been found that when a material such as this is used for the ring, the tendency of the ring to cold flow under pressure is reduced because of the resilient action of the ridges 54.

The surfaces 18a are generally radial or perpendicular to the axes of the rings, as are the surfaces 50 of the seating rings. The peaks 54a of the ridges 54 extend to the plane of the surface 50 with the result that surfaces 18a and 50 are always engaged at a plurality of annular regions.

The ridges are arranged more effectively to permit flow radially outwardly and to impede flow radially inwardly, this being desirable when the valve is in its closed position. To achieve this result, the serrations 52 are configured to provide the ribs 54 with more "give" to outward fluid flow. As best shown in FIG. 4, the serrations provide intersecting surfaces 54b and 54c, the former of which may be defined as being cylindrical or coaxial to the axis of the ring and the latter being inclined at an angle of about 60° outwardly and away from the ball, as best shown in FIG. 5. Thus when the valve is closed, and referring to FIG. 2, with fluid pressure in passage 12b, the ball 20 is moved slightly toward the left, thereby compressing somewhat the left seating ring 22. The right or upstream seating ring 22 follows the ball, whereby, as disclosed in the aforesaid Montesi application, pressures on opposite sides of the upstream ring are equalized. The inclination of the ridges enables fluid more readily to flow radially outwardly to by-pass the upstream ring 22.

Another advantage of the serrations is that there is less likelihood of the seat material being extruded into the main fluid flow path. This is because the serrations provide space to be taken up by ring material when it is placed under pressure, particularly when the valve is closed.

The fluid in the chamber 18 also acts upon the front face 22f of the downstream seating ring 22 wedging it more tightly against the surfaces 18a and 18b of the chamber and insuring a more positive seal between the ring and these surfaces. The total force in a generally leftward direction on the downstream ring 22 is approximately equal to fluid pressure times a radial circular area having a radius equal to the outer radius of the face 22f of the ring. This force is transmitted to the seating surface 18a of the valve chamber over a comparatively small area and hence the unit pressure between this ring where it contacts these seating surfaces is very high, resulting in a positive seal. Additionally, because of the slope of the walls 54b of the ridges 54 on the downstream ring 22, any fluid seeping along the rear face 22a of the ring is impeded in its radially inward flow by the ribs 54 and tends to aid in sealing the ring because of the flattening action of ribs 54, which are forced radially inward and against surface 18a.

When the valve is opened there is relatively small force on either of the seating rings in an axial direction and the ball 20 returns to a centered position between the upstream and downstream seating rings 22 as shown in FIG. 1 since the resilient action of the seating rings are approximately equal and opposite in direction to one another. In this position there is very little binding action between the rings and the ball and the ball can be rotated easily in either direction. Since the opposed seating rings 22 are identical in construction, the flow of fluid through the valve can be in either direction with the same type of seating action resulting in both cases. Furthermore, by the use of the serrations and ridges on the seating rings, the machining required on the seating surfaces of the valve chamber is not as critical since the flexibility of the ridge will account for minor variations and still provide a positive seal. Also, in case replacement of rings is required in the field, it is easier to supply a ring for a particular valve because a ring can fit valves with greater tolerance variations.

If desired, a single seating ring made in accordance with the present invention can be used in a valve designed for installation for one flow direction.

If desired, the seating ring can be made with a single serration to provide a single ridge like the ridge 54. A ring of this construction is shown in FIG. 6. The ring as a whole is illustrated by reference character 122. It is provided with a seating surface or rear face 122a for engaging the surface 18a of the valve chamber 18 and a generally conical outer peripheral seating surface 122b for engaging the surface 18b of the valve chamber. The outer peripheral corner of the ring 122 is chamfered as at 122c, and the ring is provided with a generally cylindrical inner bore 122d of substantially the same diameter of the passages 12a and 12b, a surface 122e for engaging the surface of the ball 20 and a generally radial front face 122f.

The rear face 122a of the ring is provided with an outer annular portion 150 adjacent the chamfered corner 122c and an annular serration 152 spaced inwardly providing a generally triangular cross sectioned annular ridge 154 having a pointed peak 154a. The ridge is defined by a cylindrical surface 154b and an inclined conical surface 154c, so disposed that the ridge slants radially outwardly and away from the ball.

The ring 122 functions in a manner similar to ring 22, with the single ridge 154 acting as a resilient spring member and providing tight sealing even in low pressure applications.

While the present invention has been illustrated and described in connection with the details of particular embodiments, it should be understood that such details are not intended to be limitative of the invention except insofar as set forth in the accompanying claims.

What is claimed as new and designed to be secured by Letters Patent of the United States is:

1. An annular sealing ring, for axial compression sealing engagement between a ball valve element of a ball valve and a sealing surface of a valve housing, comprising an annular sealing face, said face having a flat annular portion and an annular rib, said rib having an apical region having a flat annular surface lying in the plane of said flat portion and of such small area as to be yieldable radially of said ring by fluid pressure, the surface area of said flat annular portion being sufficient to bear substantially all of the axial compression load on said ring.

2. An annular sealing ring as set forth in claim 1, wherein said rib is inclined radially outwardly.

3. An annular sealing ring as set forth in claim 2, wherein one side of said rib is inclined radially outwardly and the other side thereof is substantially normal to the plane of said flat annular portion.

4. An annular sealing ring as set forth in claim 1, having a plurality of ribs, each having an apical region having a flat annular surface lying in the plane of said flat portion, and of such small area as to be yieldable radially of said ring by fluid pressure.

5. An annular sealing ring as set forth in claim 4, wherein each of said ribs is inclined radially outwardly.

6. An annular sealing ring as set forth in claim 5, wherein one side of each said rib is inclined radially outwardly and the other side thereof is substantially normal to the plane of said flat annular portion.

References Cited by the Examiner

UNITED STATES PATENTS

| | | | |
|---|---|---|---|
| 1,083,350 | 1/1914 | Davis | 277—207 X |
| 1,679,779 | 8/1928 | Oberhuber | 277—207 X |
| 2,201,895 | 5/1940 | Glen | 251—172 |
| 2,599,774 | 6/1952 | Ohls | 251—172 |
| 2,698,731 | 1/1955 | Kolhler | 251—174 X |
| 2,970,803 | 2/1961 | Harza | 251—175 |
| 2,978,221 | 4/1961 | Pool | 251—172 |
| 2,995,336 | 8/1961 | Usab | 251—315 X |
| 3,096,965 | 7/1963 | Margus | 251—315 X |

FOREIGN PATENTS 617,444   2/1949   Great Britain.

ISADOR WEIL, *Primary Examiner.*

CLARENCE R. GORDON, *Examiner.*